United States Patent
Stack et al.

(10) Patent No.: US 10,434,872 B2
(45) Date of Patent: Oct. 8, 2019

(54) SNAP ATTACHMENT AND OVERMOLD FOR A HOUSING

(71) Applicant: GM GLOBAL TECHNOLOGY OPERATIONS LLC, Detroit, MI (US)

(72) Inventors: Matthew M. Stack, Macomb, MI (US); Omair Mustafa, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 138 days.

(21) Appl. No.: 15/489,808

(22) Filed: Apr. 18, 2017

(65) Prior Publication Data

US 2018/0297467 A1    Oct. 18, 2018

(51) Int. Cl.
*B60K 15/04*    (2006.01)
*B60K 15/05*    (2006.01)

(52) U.S. Cl.
CPC .......... *B60K 15/04* (2013.01); *B60K 15/0406* (2013.01); *B60K 15/05* (2013.01)

(58) Field of Classification Search
CPC ..... B60K 15/04; B60K 15/0406; B60K 15/05
USPC ....................................... 296/97.22
See application file for complete search history.

(56) References Cited

U.S. PATENT DOCUMENTS

| | | | |
|---|---|---|---|
| 5,118,155 A * | 6/1992 | Koop ..................... | B60K 15/05 220/86.2 |
| 6,508,501 B1 * | 1/2003 | Meinke ................. | B60K 15/04 220/297 |
| 8,955,899 B2 * | 2/2015 | Lorenc .................. | B60K 15/04 277/637 |

* cited by examiner

*Primary Examiner* — Jason S Daniels

(57) ABSTRACT

A housing for a fuel filler opening or charge port of a vehicle is disclosed herein. The housing includes an attachment member integrated into a wall of the housing. The attachment member includes a flexible tab having at least one interface member and at least one overmold attachment surface. An overmold is positioned adjacent to the attachment member and at least partially covers the at least one overmold attachment surface. The overmold provides a closeout around the attachment member.

18 Claims, 2 Drawing Sheets

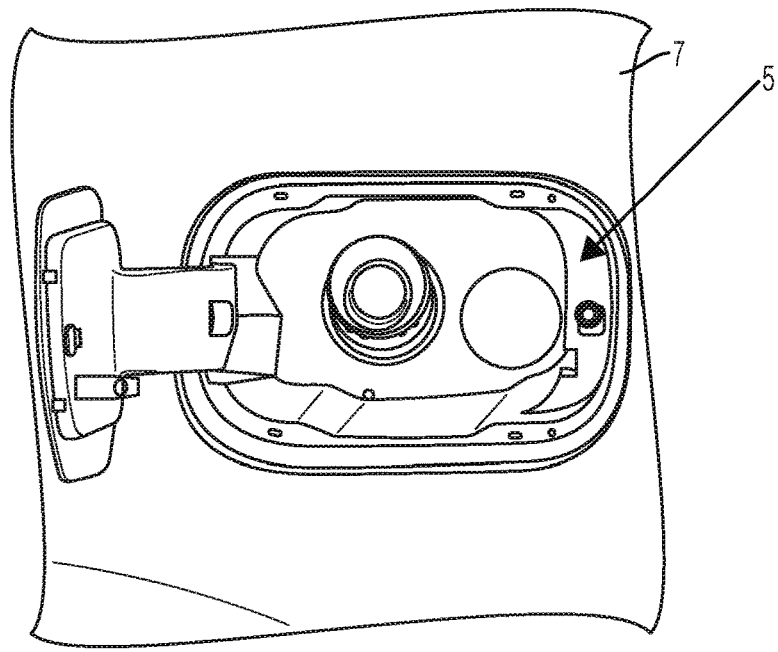
FIG. 1 - PRIOR ART
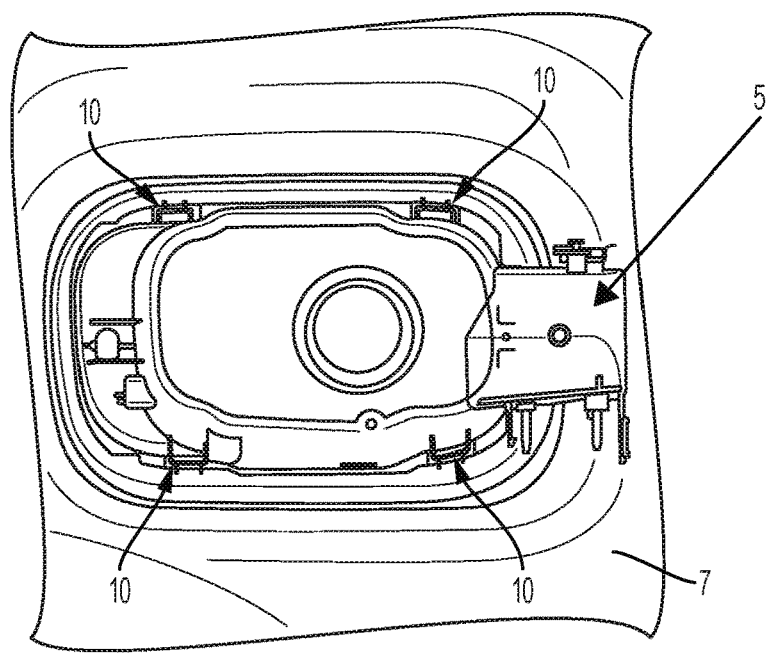
FIG. 2 - PRIOR ART

SNAP ATTACHMENT AND OVERMOLD FOR A HOUSING

INTRODUCTION

The present invention relates generally to the field of vehicles and, more specifically, to a fuel filler or charge port housing snap attachment and overmold.

Conventional fuel filler and charge port designs include plastic snap features that are molded on the rear of the part. These features often include risers to create the clearance for the snap features to deflect during installation. However, the risers or supports make the snap feature fragile and susceptible to damage during installation. Additionally, the risers increase the space required for packaging, tooling, and function of the design, increasing the overall height of the assembly and the opening in the body panel.

SUMMARY

Embodiments according to the present disclosure provide a number of advantages. For example, embodiments according to the present disclosure reduce packaging space for snap attachments. Additionally, embodiments according to the present disclosure reduce manufacturing and tooling complexity and provide stronger snap attachments.

In one aspect, a housing for a fuel filler opening or charge port of a vehicle includes an attachment member integrated into a wall of the housing, the attachment member includes a flexible tab having at least one interface member, and at least one overmold attachment surface, and an overmold positioned adjacent to the attachment member and at least partially covering the at least one overmold attachment surface. The overmold provides a closeout around the attachment member.

In some aspects, the flexible tab includes two interface members, each of the interface members extending from opposite side edges of the tab and substantially perpendicular to a tab surface of the tab.

In some aspects, an edge of the flexible tab and an edge of the housing form a U-shaped opening in the housing surrounding the tab.

In some aspects, the overmold closes the U-shaped opening surrounding the tab.

In some aspects, the at least one interface member includes a ramp surface extending from a position adjacent to the edge of the housing.

In some aspects, the ramp surface extends to an apex and the apex defines a maximum height of the at least one interface member.

In some aspects, the tab includes a depression in a surface of the tab.

In some aspects, the housing further includes a first overmold attachment surface adjacent to the at least one interface member and a second overmold attachment surface adjacent to an edge of the housing and parallel to the first overmold attachment surface.

In some aspects, the first overmold attachment surface and the second overmold attachment surface are separated by an opening.

In some aspects, the overmold at least partially covers the first and second overmold attachment surfaces and closes out the opening.

In some aspects, the at least one interface member includes a beveled edge.

In another aspect, an automotive vehicle includes a housing including at least one attachment member integrated into a wall of the housing, the attachment member including a flexible tab having two interfaces members extending perpendicular to a tab surface of the tab, a first overmold attachment surface adjacent to one of the interface members, a second overmold attachment surface adjacent to the other of the interface members, and an overmold positioned adjacent to the attachment member and at least partially covering the first and second overmold attachment surfaces, and a body panel including an opening. The flexible tab deflects when the housing is inserted into the opening.

In some aspects, an edge of the flexible tab and an edge of the housing form a U-shaped opening in the housing surrounding the tab.

In some aspects, each of the two interface members includes a ramp surface extending from a position adjacent to the edge of the housing.

In some aspects, the ramp surface extends to an apex adjacent to an end of the tab and the apex defines a maximum height of the interface member.

In some aspects, the first and second overmold attachment surfaces are adjacent to the U-shaped opening.

In some aspects, the automotive vehicle further includes a third overmold attachment surface and a fourth overmold attachment surface, the first and third overmold attachment surfaces separated by one leg of the U-shaped opening and the second and fourth overmold attachment surfaces separated by another leg of the U-shaped opening, wherein the overmold at least partially covers the first, second, third, and fourth overmold attachment surfaces and closes out the U-shaped opening in the housing.

In yet another aspect, a housing includes at least one attachment member integrated into a wall of the housing, the at least one attachment member including a flexible tab having a first interface member and a second interface member extending perpendicular to a surface of the tab, each of the first and second interface members including a ramp surface extending to an apex defining a maximum height of each of the first and second interface members, a first overmold attachment surface adjacent to the first interface member and a second overmold attachment surface adjacent to the second interface member, and an overmold, wherein an edge of the housing defines a U-shaped opening surrounding the flexible tab and the overmold at least partially covers the first and second overmold attachment surfaces and at least partially covers the housing to close out the U-shaped opening and prevent liquid or debris from entering the housing.

BRIEF DESCRIPTION OF THE DRAWINGS

The present disclosure will be described in conjunction with the following figures, wherein like numerals denote like elements.

FIG. 1 is a schematic exterior view of a fuel filler housing, according to an embodiment.

FIG. 2 is a schematic interior view of the fuel filler housing of FIG. 1, illustrating four snap attachments, according to an embodiment.

Figure 3:
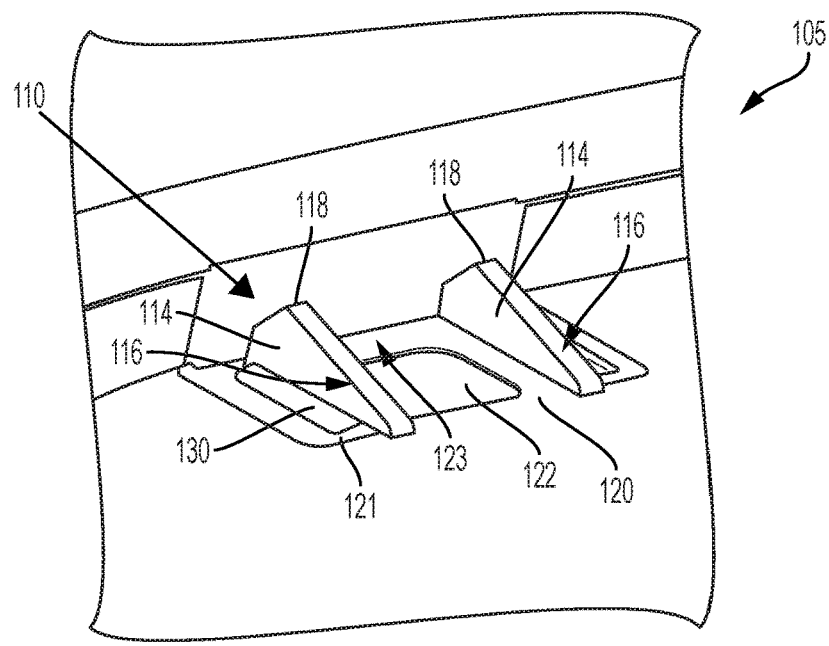
FIG. 3 is a schematic perspective view of a snap attachment, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The embodiments discussed herein disclose a snap attachment for securing a fuel fill or charge port housing to a metal structure, such as, for example and without limitation, a vehicle body structure. In some embodiments, the snap attachment is molded into the wall of the housing body. A soft rubber overmold closes out the openings in the hard plastic attachment to create a clean show surface while maintaining overall flexibility of the snap attachment.

In some embodiments, a snap-style attachment member is molded into the wall of the fuel fill or charge port housing to reduce or eliminate additional supporting features. Molding the attachment member into the wall of the housing reduces packaging space and creates a more robust snap feature. Additionally, in some embodiments, the snap attachment has a "stepped" interface with a soft overmold which increases chemical bond surfaces creating a more robust bond. The soft overmold also creates a clean and continuous surface on the show side of the housing. In some embodiments, the material of the attachment member and the overmold are similar or identical in color. When each of the materials has a standard grain, the interface between the attachment member and the overmold is virtually invisible to the customer.

With reference to FIGS. 1 and 2, conventional fuel filler and charge port housing designs employ plastic snap features that are molded on the rear of the part as a separate structure. FIG. 1 is a schematic view from the outside of a vehicle of a fuel filler housing 5 installed in a vehicle body 7. FIG. 2 is a schematic interior view of the fuel filler housing 5 illustrating a plurality of snap attachments 10 that couple the fuel filler housing 5 to the vehicle body panel 7.

The snap attachments 10 include risers to create a "doghouse" that provides clearance for the snap features or clips to deflect during installation of the housing 5. As the fuel filler or charge port housing assembly 5 is pushed into an opening provided in the supporting sheet metal, the snap features or clips deflect downwards. The snap attachments 10 extend above the surface of the housing 5, occupying space in a region where packaging constraints limit the available space. Additionally, the snap attachments 10 require that packaging space be reserved beneath each attachment 10 for tool steel to slide into the area reserved for clip deflection. The extra space required for packaging, tooling, and function of the snap attachment 10 increases the overall height of the assembly and also increases the size of the opening in the vehicle body panel 7. In order to void sink marks in the plastic material on the visible side of the housing 5, the risers are very thin and thus the risers are fragile and susceptible to damage during installation.

Additionally, conventional designs employ a soft material overmold primarily as a means of creating a visual close out to adjacent structural interfaces after installation. Embodiments discussed herein leverage the attributes of the soft material overmold in a manner that allows for functional improvement of attachment features and structural simplification.

Figure 4:
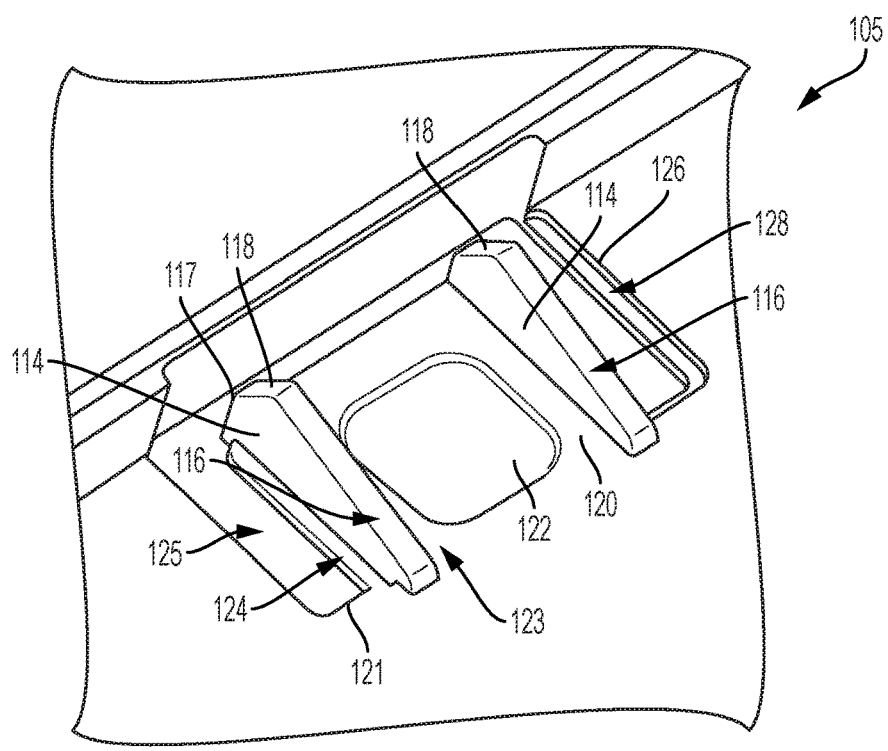
FIG. 4 is a schematic perspective top view of the snap attachment of FIG. 3.

FIGS. 3 and 4 illustrate a snap attachment member 110 for a housing 105, according to an embodiment. FIG. 3 illustrates the snap attachment 110 with an overmold. FIG. 4 illustrates the snap attachment without the overmold. The snap attachment 110 is unitarily formed, or molded, with the housing 105 to eliminate additional supporting features. Due to a lack of risers in the design, the snap attachment 110 also reduces packaging space requirements and is a more robust feature.

The snap attachment 110 includes a flexible tab 120 that extends from an edge 121 of the wall of the housing 105. In some embodiments, two snap features or interface members 114 extend from side edges of the tab 120 such that the snap features 114 are substantially perpendicular to a tab surface 123 of the tab 120. In other embodiments, the snap attachment 110 includes more or fewer snap features 114.

Each of the snap features 114 includes a ramp surface 116. The ramp surface 116 extends from a position adjacent to the edge 121 to an apex 118. The apex 118 is the highest point of the snap feature 114 and defines a maximum height of the snap feature 114. In some embodiments, each of the snap features 114 also includes a beveled edge 117. The beveled edge 117 allows the snap attachment 110 to adjust and fit openings in vehicle body sheet metal having positional variance and varying thicknesses. In some embodiments, the tab 120 includes a depression 122. The size of the depression 122 can be increased or decreased to adjust the desired stiffness and thickness of the tab 120.

The tab 120 also includes an edge surface 124, as shown in FIG. 4. The edge surface 124 is adjacent and substantially parallel to the snap feature 114. While one edge surface 124 is shown in FIG. 4, in some embodiments, another edge surface 124 (not shown) is adjacent to the other snap feature 114. The edge surface 124 extends along at least a portion of the edge of the tab 120. In some embodiments, the edge surface 124 extends partially along the edge of the tab 120 and is adjacent and substantially perpendicular to the edge 121. In some embodiments, the edge surface 124 is the same or approximately the same thickness as the tab 120. In some embodiments, the edge surface 124 has a thickness less than the thickness of the tab 120. In some embodiments, the edge 121, the edge surface 124, and the tab 120 define a substantially U-shaped opening 125 in the housing 105.

In some embodiments, the housing 105 also includes an edge depression surface 128. As shown in FIG. 4, the edge depression surface 128 extends along an edge of the opening 125 opposite and substantially parallel to the edge surface 124 (not shown). The edge depression surface 128 is separated from the edge surface 124 by one leg of the U-shaped opening 125. While one edge depression surface is shown in FIG. 4, in some embodiments, another edge depression surface 128 is opposite from and substantially parallel to the edge surface 124 shown in FIG. 4. In some embodiments, the edge depression surface 128 has a thickness less than the thickness of the tab 120 or the housing 105. In some embodiments, the edge depression surface 128 and the edge surface 124 have substantially the same thickness. In some embodiments, one edge depression surface 128 extends at least partially along one side of the U-shaped opening 125 and another edge depression surface 128 extends at least partially along the opposite side of the U-shaped opening 125 such that the U-shaped opening 125 is symmetric.

In some embodiments, a soft overmold is positioned adjacent to the attachment 110 and closes out the openings in the hard plastic housing 105. As shown in FIG. 3, an overmold 130 fills the opening 125 and creates a clean show surface while remaining flexible for installation of the housing 105 into an opening in the vehicle body panel 7. The overmold 130 provides a closeout around the molded-in snap attachment 110 of the housing 105 to improve the appearance of the housing 105 and to provide a barrier to liquid or debris. The edge surface 124 and the edge depression surface 128 each provide a lip over which an edge of the overmold 130 at least partially extends. The edge surfaces 124, 128 provide a stepped interface to increase chemical bond surfaces between the plastic housing 105 and the overmold 130, creating a more robust bond between the two pieces.

The combination of the housing 105 with the molded-in snap attachment 110 and the overmold 130 reduces packaging space for attachments and, in some embodiments, reduces the size of the fuel fill or charge port doors due to a smaller overall size of the housing 105. Additionally, the snap attachments 110 provide stronger attachment with the vehicle body panel 7 with a design that is less complex and easier to manufacture than previous designs, such as the snap attachment 10 shown in FIG. 2. While the snap attachment 110 is shown and discussed herein as part of a fuel fill or charge port housing, the snap attachment 110 may be used wherever a snap-style attachment is used, as recognized by those skilled in the art.

As the fuel filler or charge port housing assembly 105 is pushed into an opening provided in the supporting sheet metal, the snap features 114 deflect downwards. An edge of the metal opening in the supporting sheet metal slides along the angled ramp surface 116. The snap features 114 engage once the edge of the adjoining metal opening passes the apex 118 of the ramp surface 116. The flexible overmold 130 deforms as the snap features 114 deflect downwards but once the features 114 have engaged with the edge of the adjoining metal opening, the flexible overmold 130 presents a smooth, clean surface to the user.

It should be emphasized that many variations and modifications may be made to the herein-described embodiments the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to he performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A housing for a fuel filler opening or charge port of a vehicle, comprising:
    an attachment member integrated into a wall of the housing, the attachment member comprising a flexible tab having at least one interface member and at least one overmold attachment surface; and
    an overmold positioned adjacent to the attachment member and at least partially covering the at least one overmold attachment surface;
    wherein the overmold provides a closeout around the attachment member.

2. The housing of claim 1, wherein the flexible tab comprises two interface members, each of the interface members extending from opposite side edges of the tab and substantially perpendicular to a tab surface of the tab.

3. The housing of claim 1, wherein an edge of the flexible tab and an edge of the housing form a U-shaped opening in the housing surrounding the tab.

4. The housing of claim 3, wherein the overmold closes the U-shaped opening surrounding the tab.

5. The housing of claim 3, wherein the at least one interface member includes a ramp surface extending from a position adjacent to the edge of the housing.

6. The housing of claim 5, wherein the ramp surface extends to an apex and the apex defines a maximum height of the at least one interface member.

7. The housing of claim 1, wherein the tab includes a depression in a surface of the tab.

8. The housing of claim 1, wherein a first overmold attachment surface is adjacent to the at least one interface member and a second overmold attachment surface is adjacent to an edge of the housing and parallel to the first overmold attachment surface.

9. The housing of claim 8, wherein the first overmold attachment surface and the second overmold attachment surface are separated by an opening.

10. The housing of claim 9, wherein the overmold at least partially covers the first and second overmold attachment surfaces and closes out the opening.

11. The housing of claim 1, wherein the at least one interface member comprises a beveled edge.

12. An automotive vehicle, comprising:
    a housing comprising at least one attachment member integrated into a wall of the housing, the attachment member comprising a flexible tab having two interface members extending perpendicular to a tab surface of the tab, a first overmold attachment surface adjacent to one of the interface members, a second overmold attachment surface adjacent to the other of the interface members, and an overmold positioned adjacent to the attachment member and at least partially covering the first and second overmold attachment surfaces; and
    a body panel including an opening;
    wherein the flexible tab deflects when the housing is inserted into the opening.

13. The automotive vehicle of claim 12, wherein an edge of the flexible tab and an edge of the housing form a U-shaped opening in the housing surrounding the tab.

14. The automotive vehicle of claim 13, wherein each of the two interface members includes a ramp surface extending from a position adjacent to the edge of the housing.

15. The automotive vehicle of claim 14, wherein the ramp surface extends to an apex adjacent to an end of the tab and the apex defines a maximum height of the interface member.

16. The automotive vehicle of claim 13, wherein the first and second overmold attachment surfaces are adjacent to the U-shaped opening.

17. The automotive vehicle of claim 16, further comprising a third overmold attachment surface and a fourth overmold attachment surface, the first and third overmold attachment surfaces separated by one leg of the U-shaped opening and the second and fourth overmold attachment surfaces separated by another leg of the U-shaped opening, wherein the overmold at least partially covers the first, second, third, and fourth overmold attachment surfaces and closes out the U-shaped opening in the housing.

18. A housing comprising at least one attachment member integrated into a wall of the housing, the at least one attachment member comprising a flexible tab having a first interface member and a second interface member extending perpendicular to a surface of the tab, each of the first and second interface members comprising a ramp surface extending to an apex defining a maximum height of each of the first and second interface members, a first overmold attachment surface adjacent to the first interface member and a second overmold attachment surface adjacent to the second interface member, and an overmold, wherein an edge of the housing defines a U-shaped opening surrounding the flexible tab and the overmold at least partially covers the first and second overmold attachment surfaces and at least partially covers the housing to close out the U-shaped opening and prevent liquid or debris from entering the housing.

* * * * *